United States Patent [19]

Hoodes

[11] Patent Number: 5,294,467

[45] Date of Patent: Mar. 15, 1994

[54] HAND HELD UTENSIL

[75] Inventor: Peter Hoodes, Salt Lake City, Utah

[73] Assignee: Scoon Corporation, Salt Lake City, Utah

[21] Appl. No.: 849,531

[22] Filed: Mar. 11, 1992

[51] Int. Cl.[5] .......................... A01B 1/02; B28B 1/00
[52] U.S. Cl. .................................. 428/34.1; 425/276; 425/279; 425/281; 294/55; 294/1.1; 37/264
[58] Field of Search ................ 37/264, 265, DIG. 12, 37/DIG. 13; 425/276, 278, 279, 281; 294/55, 1.1; 428/34.1

[56] References Cited

U.S. PATENT DOCUMENTS

| | | | |
|---|---|---|---|
| 506,091 | 3/1893 | Bell | 294/55 |
| 652,350 | 6/1900 | Davenport | 294/55 |
| 1,228,373 | 5/1917 | Kristofek | 294/55 |
| 1,430,797 | 10/1920 | Coulson | 294/49 |
| 2,019,566 | 2/1934 | Gray | 425/276 |
| 2,077,501 | 6/1936 | Weiss | 425/281 |
| 2,238,150 | 5/1940 | Aquara et al. | 425/278 |
| 2,312,736 | 6/1942 | Schmal | 294/55 |
| 2,319,870 | 5/1943 | Larsen | 294/55 |
| 2,613,977 | 5/1946 | Kellogg | 294/1.1 |
| 2,641,496 | 8/1946 | Benezet et al. | 294/1.1 |
| 3,358,619 | 8/1964 | Pareira | 425/276 |
| 3,380,307 | 4/1968 | De Frank | 294/55 |
| 3,914,884 | 10/1975 | Guinot | 294/55 |
| 3,992,604 | 11/1976 | Leddy | 425/279 |
| 4,245,411 | 6/1979 | McMath | 37/265 |
| 4,378,670 | 8/1980 | Check et al. | 56/400.01 |

FOREIGN PATENT DOCUMENTS 3104446 10/1982 Fed. Rep. of Germany .

Primary Examiner—Ellis P. Robinson
Assistant Examiner—Rena L. Dye
Attorney, Agent, or Firm—Wood, Phillips, VanSanten, Hoffman & Ertel

[57] ABSTRACT

A hand held utensil has a blade with an arcuate working edge and radially spaced concave and convex surfaces. The utensil has a grip which is axially spaced from the arcuate edge and has a convex surface which is grasped by the hand of a user for manipulating the blade. The convex surface of the blade and the convex surface of the grip have congruent spherical curvature with spaced apart centers of curvature. The grip comprises a volume of wood, plastic, metal, or other suitable material which conforms to the space bounded by a pair of intersected eccentric spheres which each have a radius equal to the radii of curvature of the blade and the grip.

19 Claims, 2 Drawing Sheets

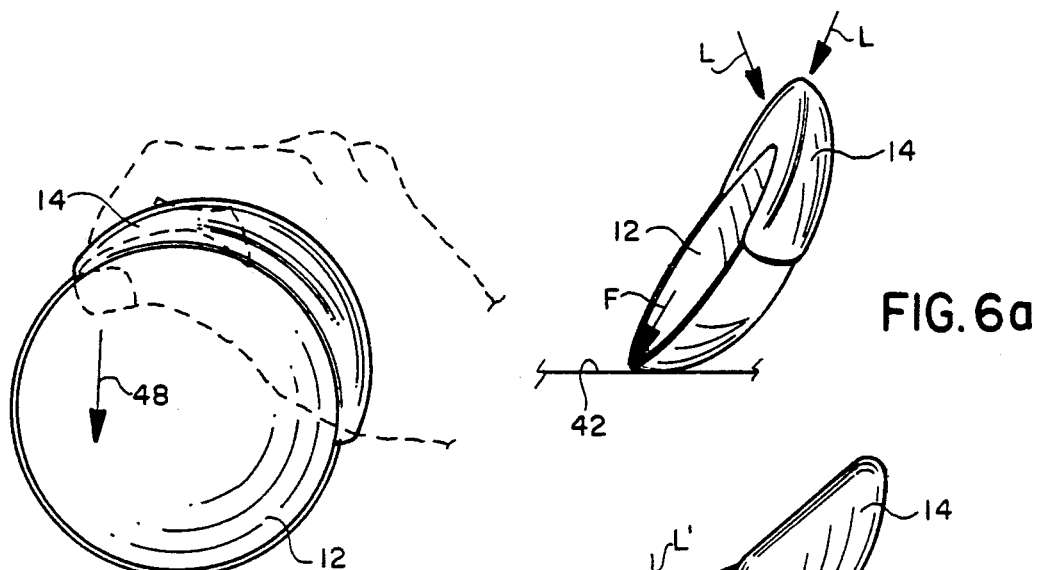
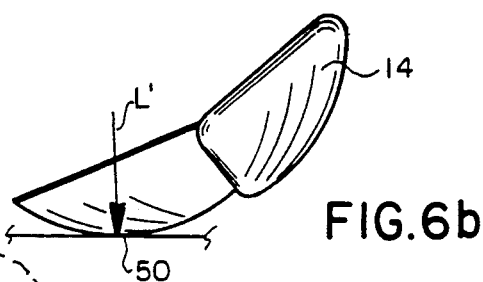
FIG. 6  FIG. 6a  FIG. 6b
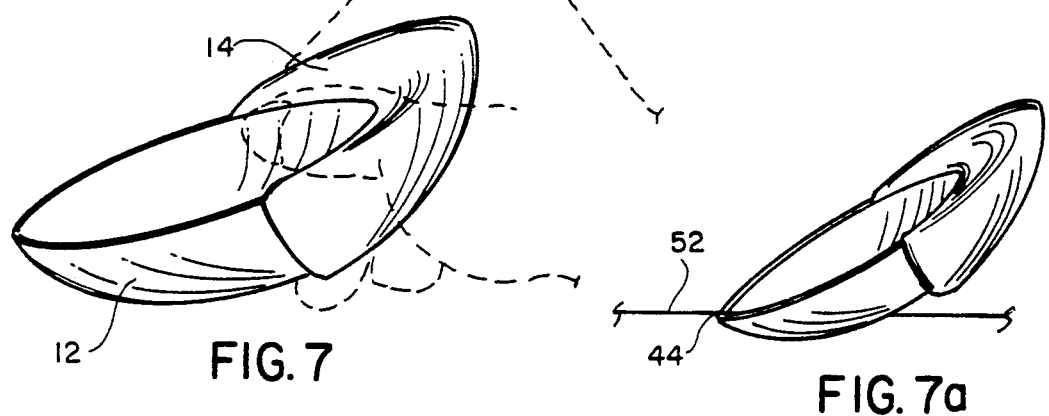
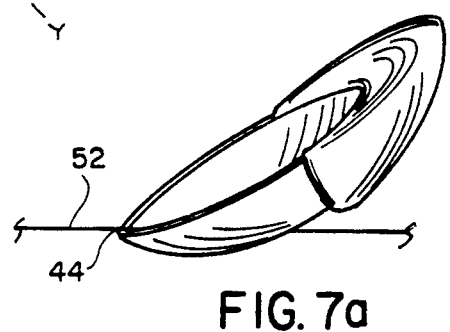
FIG. 7  FIG. 7a
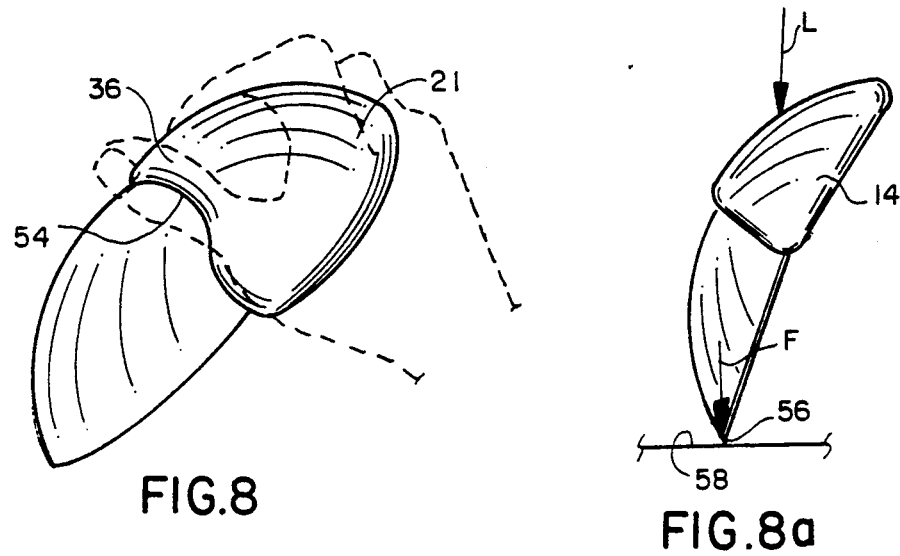
FIG. 8  FIG. 8a

HAND HELD UTENSIL

BACKGROUND OF THE INVENTION

1. Technical Field

The present invention is a hand held utensil with an ergonomically designed grip for improving the efficiency and comfort with which a user may perform various manual tasks.

2. Background Art

Prior hand held utensils, such as ice cream scoops, consist of a broad flat or hollowed-out blade with an elongated attached handle and are operated in a manner similar to the common garden shovel. That is, a user grasps the handle to manipulate the blade and scoop packed material, and the handle then is used to lift and dispose of the material which is scooped by the blade. A shovel is particularly well emulated in the "spade"-type ice cream scoop shown in U.S. Pat. No. 3,822,976. Although the shovel design works well in a garden, problems arise when attempting to apply similar physical principles to the scooping of ice cream.

In contrast to a shovel, wherein a user is able to place a foot comfortably on a rear edge of the blade and apply body weight forces for driving the shovel blade into hard, densely packed material, it is not practical to use one's foot for applying force to the blade of an ice cream scoop. Instead, one is required to rely solely on the strength of the hand, wrist and forearm.

The traditional ice cream scoop fails to provide the amount of leverage obtained with such long-handled tools as a garden shovel. When scooping ice cream, the fore-finger of the server's hand which grasps an ice cream scoop usually is pinched between the handle of the scoop and the surface of the ice cream to provide a fulcrum about which the ice cream scoop is moved. Force is applied by the server's hand to the handle to rotate the blade about the fulcrum and scoop ice cream from a container.

The ratio of the distance between the point at which the blade engages the ice cream and the server's forefinger to the distance between the server's forefinger and the point at which force is applied on the handle is such that ice cream scoops do not offer as great a mechanical advantage as a long-handled implement which is rotated about a point near the blade.

The problem discussed above also can result in discomfort in the hand and fore-finger of the server scooping ice cream. Scooping forces which act on the server's fore-finger can cause fatigue or blistering of the skin. If the server allows the ice cream to remain unrefrigerated until it is soft enough to be easily scooped, the quality of the ice cream might be reduced and one who eats the ice cream may be subjected to possible health risks.

SUMMARY OF THE INVENTION

The principle object of the present invention is to provide a new hand held utensil for improving the efficiency and comfort with which a user may perform scooping tasks, such as scooping ice cream from a refrigerated container.

In the exemplary embodiment, the utensil has a blade with a circular working edge and radially spaced concave and convex surfaces. The utensil has a grip which is axially spaced from the working edge and has a convex surface which is grasped by the hand of a user for manipulating the blade. The grip is attached to the blade with rivets, adhesive, or other suitable means. Alternatively, the utensil has a unitary construction in which the grip is integral with the blade.

In the preferred embodiment, the convex surface of the blade and the convex surface of the grip have congruent spherical curvature with spaced apart centers of curvature. The grip has a concave surface with a curved recess which conforms to the curvature of the convex surface of the blade and seats a portion of the blade. The recess has a depth substantially equal to the thickness of the blade so that the concave surfaces on the grip and the blade form a continuous surface.

The grip comprises a volume of wood, plastic, metal, or other suitable material which conforms to the space bounded by a pair of intersected eccentric spheres which each have a radius equal to the radii of curvature of the blade and the grip. The grip has a tapered thickness and is ergonomically contoured to fit comfortably within the hand of a user, whereby the hand held utensil becomes an extension of the user's hand and complements the natural hand motion for facilitating such tasks as scooping, digging, and prying motions.

The relationship of the grip to the blade allows the utensil to be manipulated in such a way that a fulcrum is defined on the convex surface of the blade when the utensil is used to perform a scooping task. A user applies force to the grip to rotate the utensil about the fulcrum on the convex surface and engage a working edge of the blade with the material being scooped. The proximity of the grip to the fulcrum relative to the distance between the fulcrum and the working edge provides an improved mechanical advantage over long-handled ice cream scoops in which the working edge is spaced relatively far from the fulcrum.

BRIEF DESCRIPTION OF THE DRAWINGS

The features of this invention which are believed to be novel are set forth with particularity in the appended claims and are illustrated in the accompanying drawings, in which like reference numerals identify like elements in the FIGURES and in which:

FIG. 6 is a diagrammatic illustration of the manner in which the scooping utensil is grasped to perform a scooping task;

FIG. 6A is a diagrammatic illustration of the manner in which force is transmitted to the blade when the scooping utensil is grasped as shown in FIG. 6 and is used to initiate a mashing task;

FIG. 6B is a diagrammatic illustration of the manner in which force is transmitted to the blade when the scooping utensil is grasped as shown in FIG. 6 and is used to complete a mashing task;

FIG. 7 is a diagrammatic illustration of the manner in which the scooping utensil is grasped to perform a skimming task;

FIG. 7A is a diagrammatic illustration of the orientation of the scooping utensil during a skimming task;

FIG. 8 is a diagrammatic illustration of the manner in which the scooping utensil is grasped to perform a chopping or cutting task; and FIG. 8A is a diagrammatic illustration of the manner in which force is transmitted to the blade when the scooping utensil is grasped as shown in FIG. 8.

DESCRIPTION OF THE PREFERRED EMBODIMENT

Figure 1:
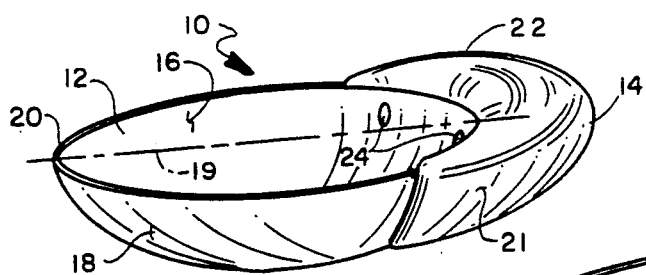
FIG. 1 is a perspective view illustrating a hand held utensil according to the present invention.

FIG. 1 illustrates a preferred embodiment of the hand held utensil 10 with a curved blade 12 an attached grip 14. The grip 14 surrounds a portion of the blade exterior and can be grasped by the hand of a user individual for manipulating the blade 12 and operating the utensil 10 to perform such manual tasks as scooping, prying, mashing and chopping.

The blade 12 preferably is metal, wood, plastic, or composite material and has an upwardly opening concave surface 14 and a radially outwardly spaced convex surface 18. A planar circular edge 20 extends around the perimeter of the blade 12. The blade 12 has a longitudinal axis 19 lying in the plane defined by the edge 20, and a thickness equal to the radial distance between the concave surface 14 and the convex surface 16. When the utensil 10 is grasped as described below, the concave surface 14, the working edge 20, and the convex surface 18 are accessible for performing a variety of tasks.

Figure 1A:
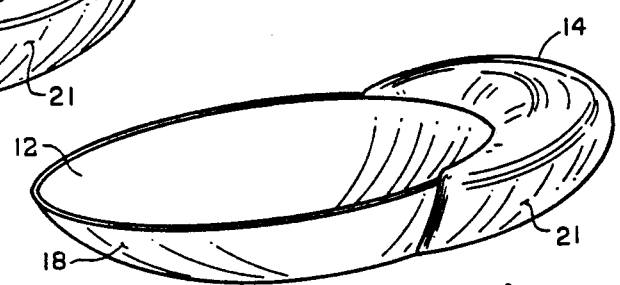
FIG. 1A is a perspective view illustration an alternative embodiment of a hand held utensil having an ellipsoidal blade and an integral grip.

The grip 14 is formed of wood, metal, composite material, or plastic and embraces the convex surface 18 on the blade 12 at a point axially spaced from the working edge 20. The grip 14 has a convex surface 21 which extends circumferentially around a portion of the blade 12 and sweeps upwardly beyond the plane defined by the working edge 20. The convex surface 21 terminates at a coplanar edge 22, with the plane defined by the edge 22 being inclined with respect to the plane defined by the edge 20. In the preferred embodiment, a plurality of circumferentially spaced rivets 24 rigidly couple the blade 12 and grip 14. The present invention also envisions alternative embodiments in which an adhesive or other suitable means are used for attaching the blade 12 to the grip 14. In addition, and as shown in the alternative embodiment illustrated in FIG. 1A, the utensil 10 may have a unitary construction in which the grip 14 is integral with the blade 12.

Figure 2:
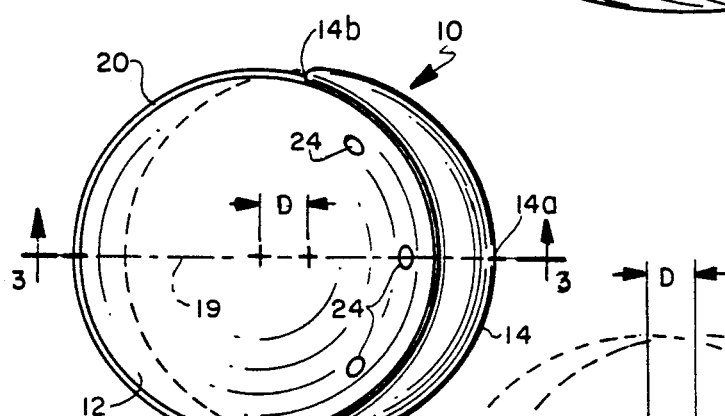
FIG. 2 is a top plan view of the scooping utensil, the circular section of the spherical element from which the grip is constructed shown in phantom.
Figure 3:
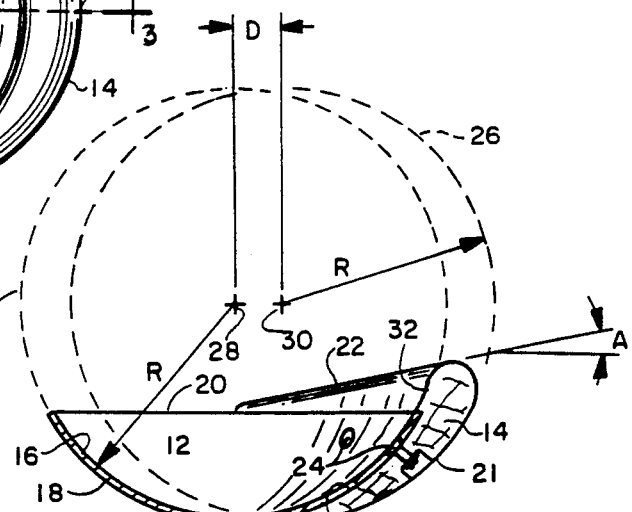
FIG. 3 is an enlarged sectional view taken along the line 3—3 in FIG. 2, with the circular sections of the spherical elements from which the blade and grip are constructed shown in phantom.

The construction of the blade 12 and grip 14 are illustrated further in FIGS. 2 and 3, wherein the geometric relationship between the blade 12 and grip 14 is disclosed in greater detail. It is the unique relationship between the blade 12 and the grip 14 which provides improved mechanical advantage and comfort.

More particularly, the curved blade 12 and grip 14 are struck from spherical elements which preferably have equal radii R. The convex surface 18 on the blade 12 and the convex surface 21 on the grip 14 thus have congruent spherical curvature, with each convex surface having a constant radius of curvature equal to the radius R of the spherical elements from which the blade 12 and the grip 14 are struck. In the alternative embodiment (FIG. 1A) the convex surface 18 on the blade 12 and the convex surface 21 on the grip 14 have congruent elliptical curvature. Alternative, the blade 12 and grip 14 can be struck from spherical elements which have different radii of curvature.

The shape of the grip 14 and the orientation of the grip 14 with respect to the blade 12 can be best understood by considering the grip 14 to comprise a volume of material which lies within the space bounded by a pair of intersected eccentric spheres 24 and 26 wherein the centers 28 and 30, respectively, of the spheres are laterally offset a distance D. The volume of material is truncated by an inclined plane which intersects the center of the circular edge 20 of the blade 12, such that the gripping edge 22 on the grip 14 lies in a plane which is inclined at an angle A with respect to the plane defined by the circular edge 20 of the blade 12.

As seen in a vertical sectional view taken along the longitudinal axis 19 (FIG. 3), the grip 14 is tapered and has a maximum thickness at a point spaced above the plane defined by the working edge 20. In a top plan view (FIG. 2) the thickness of the grip 14 varies circumferentially around the perimeter of the blade 12. The grip 14 has a maximum thickness in plan view at point 14a lying on the longitudinal axis 19, and has a minimum thickness in plan view at a pair of points 14b symmetrically spaced about the axis 19 and lying at the intersection of the gripping edge 22 and the arcuate working edge 20 of the blade 12.

The grip 14 also has a concave surface 32 which is integrated smoothly with the convex surface 32 at the gripping edge 22. The blade 12 is seated on a recessed concave surface 34 on the grip 14, with the concave surface 34 being appropriately curved to conform to the shape of convex surface 18 on the blade 12. The concave surface 34 is radially recessed to a depth equal to the thickness of the blade 12, such that in the assembled condition of the utensil 10 the concave surface 16 on the blade 12 the concave surface 32 on the grip 14 form a continuous upwardly opening surface. A flat 36 is provided on the grip 14 and is tangentially aligned with a central point 38 of the convex surface 18, such that the flat 36 and the point 38 provide a stable support whereupon the utensil 10 may rest when not in use. Alternatively, the flat 36 may be positioned along the convex surface 18 such that the plane which contains the circular edge 20 is inclined with respect to the horizontal when the utensil 10 is supported at rest.

In a preferred form of the invention, the blade 12 and the grip 14 are struck from spherical elements which have a radius of 4¼ inches. The blade 12 is formed by truncating one of the spherical elements at a distance of 1 7/16 inches from the center 28 of the sphere, such that the circular working edge 20 of the blade 12 has a diameter of 4 inches and the radial distance between the central point 38 and the plane containing the working edge 20 is 1 inch. The coplanar edge 22 of the grip 14 extends 9/16 inches above the working edge 20, and defines a plane which is inclined at an angle of 11 degrees with respect to the plane defined by the working edge 20. The thickness of the grip 14 corresponds to the volume defined between the spheres when the spheres are theoretically intersected and the centers of the spheres are laterally offset ⅛ inches.

The indicated dimensions of the blade 12 and grip 14 result in an ergonomically enhanced utensil 10 which conforms comfortably to the contours of a range of human hand sizes. Moreover, the geometric relationship of the handling surfaces on the grip 14 and the working surfaces on the blade 12 provide an implement which is well suited to the efficient application of hand and forearm muscles for performing a number of tasks.

Figure 4:
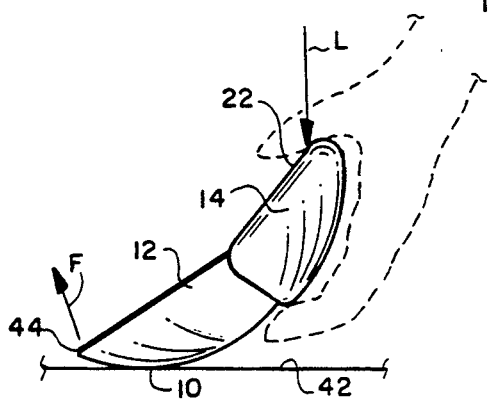
FIG. 4 is a diagrammatic illustration of the manner in which the scooping utensil can be grasped to perform a prying task.

FIG. 4 illustrates the leverage created by the application of force to the grip 14 when the utensil 10 is used to scoop frozen ice cream 42. The application of a downward force L to the gripping edge 22 causes the utensil 10 to rotate about a fulcrum 40 at the point of contact between the convex surface 18 and the surface of the ice cream. The distance between the fulcrum 40 and the point at which the force L is applied to the grip 14 produces a mechanical advantage whereby a resultant force F is generated to a load (not shown) at the leading edge 44 of the blade 12.

Figure 5:
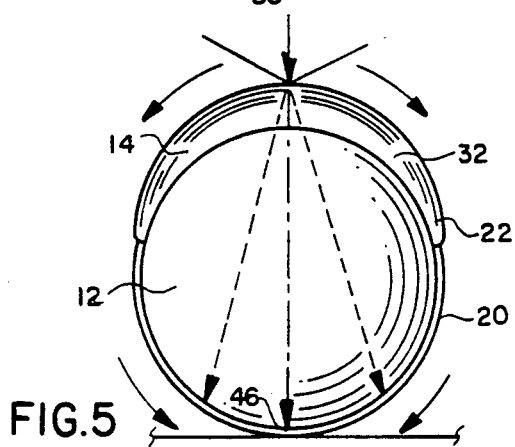
FIG. 5 is a schematic illustration of the manner in which force is transmitted to the working edge of the blade.

FIG. 5 schematically illustrates the manner in which force can be applied to material being worked by rocking the utensil 10 about a fulcrum 46.

FIGS. 6, 6a and 6b illustrate the manner in which the utensil 10 is used to perform a grinding or mashing task. The utensil 10 initially is grasped with the thumb resting along concave surface 32 and edge 22 and the remaining fingers curled around convex surface 21. Force L then is applied to the grip 14 and convex surface 21 transmits a contact force F to a surface 46 which contains material to be ground. The user then slides his thumb across the concave surface 16 (as indicated by the arrow 48) to rotate the utensil 10 about a fulcrum 50 and apply force L' for grinding material which is trapped beneath the blade 12.

FIGS. 7 and 7a illustrate the manner in which the utensil 10 is used to perform a skimming or measuring task. The utensil 10 is grasped with the thumb resting along concave surface 32 and edge 22, and the remaining fingers curled around convex surface 21. The leading edge 44 of the working edge 20 then is lowered beneath the surface 52 of a volume of liquid to be skimmed or measured.

FIGS. 8 and 8a illustrate the manner in which the utensil 10 is used to perform a chopping or cutting task. The underside of the utensil 10 is grasped with the thumb resting along a contoured edge 54 on the grip 14 adjacent the flat 36. The fingers are curled around the convex surface 21 with the utensil 10 held in an inverted downwardly opening orientation. The leading edge 56 of the working edge 20 then is forced downwardly by the application of a force L to the grip 14 to transmit a chopping or cutting force F to material supported on an underlying surface 58.

The contoured edge 54 also facilitates manipulation of the blade 12 when the utensil 10 is grasped in the manners illustrated in FIGS. 4 and 6. When the thumb applies pressure to the gripping edge 22, the fingertips of the user extend under the utensil 10 and engage the edge 54. The edge 54 provides a site for the application of addition forces for comfortably drawing the utensil 10 into the palm of a user and for improving the efficiency with which hand and wrist muscles can be used to apply forces to the blade 12.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A hand held utensil comprising:
a blade having a planar arcuate edge and a longitudinal axis lying in the plane defined by said edge; and
a grip spaced axially from the arcuate edge and having a convex surface which is grasped by the hand of a user for manipulating the blade,
the blade having a convex surface which is bounded by the arcuate edge and the grip,
the convex surfaces of the blade and grip being spaced apart along said longitudinal axis and having congruent curvature.

2. The utensil of claim 1 in which the convex surface of the blade and the convex surface of the grip have spherical curvature.

3. The utensil of claim 2 in which the convex surface of the blade and the convex surface of the grip have spaced apart centers of curvature.

4. The utensil of claim 1 in which the convex surface of the blade and the convex surface of the grip have elliptical curvature.

5. The utensil of claim 1 in which the grip comprises a volume of material which conforms to the space bounded by a pair of intersected eccentric spheres.

6. The utensil of claim 1 in which the grip has a tapered thickness in plan view, the grip having a maximum thickness in plan view at a point lying on said longitudinal axis and the grip having a minimum thickness in plan view at a pair of points spaced symmetrically about said longitudinal axis.

7. The utensil of claim 1 in which the grip has a tapered thickness in a vertical sectional view taken along said longitudinal axis.

8. The utensil of claim 1 in which the grip has a contoured edge spaced from the gripping edge for engagement by the fingertips of a user and whereat the user can apply forces for drawing the utensil into the palm of the user.

9. The utensil of claim 1 in which the convex surface of the grip has a flat on which the utensil may rest when not in use.

10. The utensil of claim 1 in which the grip and the blade are separate members, and including means for attaching the grip to the blade.

11. The utensil of claim 10 in which the grip is attached to the blade with rivets.

12. The utensil of claim 10 in which the grip is attached to the blade with adhesive.

13. The utensil of claim 1 in which the grip has a planar gripping edge, the plane defined by the gripping edge being inclined with respect to the plane defined by the arcuate edge of the blade.

14. The utensil of claim 1 in which the blade is composed of a material selected from the group consisting of wood, plastic, composite material and metal.

15. The utensil of claim 1 in which the grip is composed of a material selected from the group consisting of wood, plastic, composite material and metal.

16. A hand held utensil comprising:
a blade having a planar arcuate edge and a longitudinal axis lying in the plane defined by said edge;
a grip spaced axially from the arcuate edge and having a convex surface which is grasped by the hand of a user for manipulating the blade, the blade having a convex surface which is bounded by the arcuate edge and the grip,
the convex surface of the blade and the convex surface of the grip having equal radii of spherical curvature.

17. A hand held utensil comprising:

a blade having a planar arcuate edge and a longitudinal axis lying in the plane defined by said edge;

a grip separate from the blade and spaced axially from the arcuate edge and having a convex surface which is grasped by the hand of a user for manipulating the blade and a recess for seating the blade; and means for attaching the grip to the blade.

18. The utensil of claim 17 in which the recess on the grip is a concave surface which conforms to the convex surface of the blade.

19. The utensil of claim 17 in which the blade has a concave surface spaced from the convex surface of the blade and the grip has a second concave surface adjacent to the recess, the distance between the concave surface and the convex surface of the blade being substantially equal to the distance which the concave surface is recessed into the grip so that the concave surface of the blade and the second concave surface of the grip form a continuous surface.

* * * * *